US012482416B2

(12) United States Patent
Pyo

(10) Patent No.: US 12,482,416 B2
(45) Date of Patent: Nov. 25, 2025

(54) ORGANIC LIGHT EMITTING DISPLAY (OLED) DEVICE AND METHOD EXPRESSING DESIRED BLACK AND WHITE GRAYSCALES IN AREAS OF DIFFERENT PIXEL DENSITIES

(71) Applicant: SAMSUNG DISPLAY CO., LTD., Yongin-si (KR)

(72) Inventor: Si Beak Pyo, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/196,131

(22) Filed: May 11, 2023

(65) Prior Publication Data

US 2024/0153452 A1 May 9, 2024

(30) Foreign Application Priority Data

Nov. 3, 2022 (KR) ........................ 10-2022-0145413

(51) Int. Cl.
*G09G 3/3233* (2016.01)

(52) U.S. Cl.
CPC ... *G09G 3/3233* (2013.01); *G09G 2300/0439* (2013.01); *G09G 2300/0819* (2013.01); *G09G 2300/0842* (2013.01); *G09G 2310/0202* (2013.01); *G09G 2320/0238* (2013.01); *G09G 2320/041* (2013.01); *G09G 2320/0626* (2013.01); *G09G 2330/021* (2013.01); *G09G 2330/028* (2013.01); *G09G 2360/16* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2320/0238; G09G 2320/0626
USPC ...................................................... 345/76–83
See application file for complete search history.

(56) References Cited

U.S. PATENT DOCUMENTS

| | | | | |
|---|---|---|---|---|
| 11,756,477 B2 * | 9/2023 | Song | G09G 3/3233 | 345/55 |
| 2005/0140606 A1 * | 6/2005 | Choi | G09G 3/3233 | 345/76 |
| 2008/0106538 A1 * | 5/2008 | Ko | G09G 3/3233 | 345/211 |
| 2008/0284693 A1 * | 11/2008 | Sarma | G09G 3/3233 | 345/82 |

(Continued)

*Primary Examiner* — Ke Xiao
*Assistant Examiner* — Nelson Lam
(74) *Attorney, Agent, or Firm* — CANTOR COLBURN LLP

(57) ABSTRACT

A display device includes: a pixel unit including a first area including first pixels disposed with a first density and a second area including second pixels disposed with a second density smaller than the first density; a power supply for supplying a first power voltage commonly supplied to cathodes of first light emitting elements of the first pixels; and a second-power voltage setting unit for setting a magnitude of a second power voltage commonly supplied to cathodes of second light emitting elements of the second pixels. When the pixel unit displays a black image, the second-power voltage setting unit sets the second power voltage to be higher than the first power voltage.

17 Claims, 5 Drawing Sheets

(56) References Cited

U.S. PATENT DOCUMENTS

| | | | | |
|---|---|---|---|---|
| 2010/0253707 | A1* | 10/2010 | Miyake | G09G 3/3233<br>345/82 |
| 2014/0104328 | A1* | 4/2014 | Kim | G09G 3/3225<br>345/691 |
| 2014/0118426 | A1* | 5/2014 | Chun | G09G 3/20<br>345/691 |
| 2015/0070407 | A1* | 3/2015 | Lee | G09G 3/3233<br>345/76 |
| 2018/0158401 | A1* | 6/2018 | Wang | G09G 3/3233 |
| 2020/0126469 | A1* | 4/2020 | Moon | H10K 50/81 |
| 2021/0201758 | A1* | 7/2021 | Pyo | G09G 3/3233 |
| 2021/0248956 | A1* | 8/2021 | Pyo | G09G 3/32 |
| 2022/0139298 | A1* | 5/2022 | Park | G09G 3/32<br>345/76 |
| 2022/0262299 | A1 | 8/2022 | Pyo et al. | |

* cited by examiner

ORGANIC LIGHT EMITTING DISPLAY (OLED) DEVICE AND METHOD EXPRESSING DESIRED BLACK AND WHITE GRAYSCALES IN AREAS OF DIFFERENT PIXEL DENSITIES

This application claims priority to Korean patent application No. 10-2022-0145413, filed on Nov. 3, 2022, and all the benefits accruing therefrom under 35 U.S.C. § 119, the content of which in its entirety is herein incorporated by reference.

BACKGROUND

1. Technical Field

The present disclosure generally relates to a display device and a voltage setting method thereof.

2. Related Art

With the development of information technologies, the importance of a display device which is a connection medium between a user and information increases. Accordingly, display devices such as a liquid crystal display device and an organic light emitting display device are increasingly used.

In order to reduce manufacturing cost, a plurality of display devices may be simultaneously formed on a large-area mother substrate, and be separated into individual display devices by scribing the display devices.

However, the individual display devices may include elements having different driving characteristics according to their positions on the mother substrate or another cause. Therefore, when voltages having the same magnitude are collectively set with respect to all the display devices, there may occur a problem in that light is not emitted with a luminance corresponding to a grayscale.

Conventionally, in order to solve the problem, a large margin for a voltage was provided to set voltages. Therefore, unnecessary power consumption of the individual display devices may increase.

In addition, densities of pixels in different areas of a pixel unit may be different from each other according to the kind of a display device. When different voltages are used in different areas, the number of necessary lines may increase.

SUMMARY

Embodiments provide a display device and a driving method thereof, which can express a desired black grayscale and a desired white grayscale by using a minimum number of lines with respect to a plurality of areas having different pixel densities, and minimize a display delay in an intermediate grayscale.

In accordance with an aspect of the present disclosure, there is provided a display device including: a pixel unit including a first area including first pixels disposed with a first density and a second area including second pixels disposed with a second density smaller than the first density; a power supply configured to supply a first power voltage commonly supplied to cathodes of first light emitting elements of the first pixels; and a second-power voltage setting unit configured to set a magnitude of a second power voltage commonly supplied to cathodes of second light emitting elements of the second pixels. When the pixel unit displays a black image, the second-power voltage setting unit sets the second power voltage to be higher than the first power voltage.

When the pixel unit displays the black image, a magnitude of a first data voltage supplied to the first pixels may be equal to a magnitude of a second data voltage supplied to the second pixels.

When the pixel unit displays the black image, a magnitude of a first transistor-off voltage supplied to the first pixels may be equal to a magnitude of a second transistor-off voltage supplied to the second pixels.

When the pixel unit displays the black image, a magnitude of a first initialization voltage supplied to the first pixels may be equal to a magnitude of a second initialization voltage supplied to the second pixels.

Each of the first pixels may include: a first transistor including a gate electrode connected to a first node, a first electrode connected to a second node, and a second electrode connected to a third node; a second transistor including a gate electrode for receiving the first transistor-off voltage, a first electrode connected to a data line, and a second electrode connected to the second node; a third transistor including a gate electrode for receiving the first transistor-off voltage, a first electrode connected to the first node, and the second electrode connected to the third node; a fourth transistor including a gate electrode for receiving the first transistor-off voltage, a first electrode connected to the first node, and a second electrode for receiving an on-bias voltage; a fifth transistor including a gate electrode connected to an emission line, a first electrode for receiving a third power voltage, and a second electrode connected to the second node; a sixth transistor including a gate electrode connected to the emission line, a first electrode connected to the third node, and a second electrode connected to a fourth node; a seventh transistor including a gate electrode for receiving the first transistor-off voltage, a first electrode for receiving the first initialization voltage, and a second electrode connected to the fourth node; a storage capacitor including a first electrode for receiving the third power voltage and a second electrode connected to the first node; and a light emitting element including an anode connected to the fourth node and a cathode for receiving the first power voltage.

Each of the second pixels may include: a first transistor including a gate electrode connected to a first node, a first electrode connected to a second node, and a second electrode connected to a third node; a second transistor including a gate electrode for receiving the second transistor-off voltage, a first electrode connected to a data line, and a second electrode connected to the second node; a third transistor including a gate electrode for receiving the second transistor-off voltage, a first electrode connected to the first node, and a second electrode connected to the third node; a fourth transistor including a gate electrode for receiving the second transistor-off voltage, a first electrode connected to the first node, and a second electrode for receiving an on-bias voltage; a fifth transistor including a gate electrode connected to an emission line, a first electrode for receiving a third power voltage, and a second electrode connected to the second node; a sixth transistor including a gate electrode connected to the emission line, a first electrode connected to the third node, and a second electrode connected to a fourth node; a seventh transistor including a gate electrode for receiving the second transistor-off voltage, a first electrode for receiving the second initialization voltage, and a second electrode connected to the fourth node; a storage capacitor including a first electrode for receiving the third power voltage and a second electrode connected to the first node; and a light emitting element including an anode connected to the fourth node and a cathode for receiving the second power voltage.

The second-power voltage setting unit may include an average grayscale calculator configured to calculate a current average grayscale of a plurality of image frames for the second area.

The second-power voltage setting unit may further include: an offset lookup table configured to store offsets corresponding to various average grayscales; and an offset selector configured to select one of the offsets, based on the current average grayscale.

The second-power voltage setting unit may further include: a first-power voltage lookup table configured to store magnitudes of the first power voltage; and a second-power voltage determiner configured to determine the magnitude of the second power voltage by adding the selected offset to one of the magnitudes of the first power voltage.

The second-power voltage setting unit may further includes an offset lookup table configured to store offsets corresponding to various temperature information, various maximum luminance information, and various average grayscales; and an offset selector configured to select one of the offsets based on current temperature information, current maximum luminance information, and the current average grayscale.

In accordance with another aspect of the present disclosure, there is provided a voltage setting method of a display device including a first area including first pixels disposed with a first density and a second area including second pixels disposed with a second density smaller than the first density, the voltage setting method including: displaying, by the first area, a black image, based on a first power voltage and a first temporary black data voltage; increasing a magnitude of the first temporary black data voltage until a luminance of the first area becomes smaller than a first threshold black luminance, and setting a magnitude of a first black data voltage for the first area to be equal to a final magnitude of the first temporary black data voltage; setting a magnitude of a second black data voltage for the second area to be equal to the magnitude of the first black data voltage; displaying, by the second area, a black image, based on a second temporary power voltage and the second black data voltage; and increasing a magnitude of the second temporary power voltage until a luminance of the second area becomes smaller than a second threshold black luminance, and setting a magnitude of a second power voltage for the second area to be equal to a final magnitude of the second temporary power voltage.

The first power voltage may be a voltage commonly supplied to cathodes of first light emitting elements of the first pixels, and the second power voltage may be a voltage commonly supplied to cathodes of second light emitting elements of the second pixels.

When the display device displays the black image, the second power voltage may be set higher than the first power voltage.

When the display device displays the black image, a magnitude of a first transistor-off voltage supplied to the first pixels may be set equal to a magnitude of a second transistor-off voltage supplied to the second pixels.

When the display device displays the black image, a magnitude of a first initialization voltage supplied to the first pixels may be set equal to a magnitude of a second initialization voltage supplied to the second pixels.

Each of the first pixels may include: a first transistor including a gate electrode connected to a first node, a first electrode connected to a second node, and a second electrode connected to a third node; a second transistor including a gate electrode receiving the first transistor-off voltage, a first electrode connected to a data line, and a second electrode connected to the second node; a third transistor including a gate electrode receiving the first transistor-off voltage, a first electrode connected to the first node, and the second electrode connected to the third node; a fourth transistor including a gate electrode receiving the first transistor-off voltage, a first electrode connected to the first node, and a second electrode receiving an on-bias voltage; a fifth transistor including a gate electrode connected to an emission line, a first electrode receiving a third power voltage, and a second electrode connected to the second node; a sixth transistor including a gate electrode connected to the emission line, a first electrode connected to the third node, and a second electrode connected to a fourth node; a seventh transistor including a gate electrode receiving the first transistor-off voltage, a first electrode receiving the first initialization voltage, and a second electrode connected to the fourth node; a storage capacitor including a first electrode receiving the third power voltage and a second electrode connected to the first node; and a light emitting element including an anode connected to the fourth node and a cathode receiving the first power voltage.

Each of the second pixels may include: a first transistor including a gate electrode connected to a first node, a first electrode connected to a second node, and a second electrode connected to a third node; a second transistor including a gate electrode receiving the second transistor-off voltage, a first electrode connected to a data line, and a second electrode connected to the second node; a third transistor including a gate electrode receiving the second transistor-off voltage, a first electrode connected to the first node, and a second electrode connected to the third node; a fourth transistor including a gate electrode receiving the second transistor-off voltage, a first electrode connected to the first node, and a second electrode receiving an on-bias voltage; a fifth transistor including a gate electrode connected to an emission line, a first electrode receiving a third power voltage, and a second electrode connected to the second node; a sixth transistor including a gate electrode connected to the emission line, a first electrode connected to the third node, and a second electrode connected to a fourth node; a seventh transistor including a gate electrode receiving the second transistor-off voltage, a first electrode receiving the second initialization voltage, and a second electrode connected to the fourth node; a storage capacitor including a first electrode receiving the third power voltage and a second electrode connected to the first node; and a light emitting element including an anode connected to the fourth node and a cathode receiving the second power voltage.

When the display device displays the black image, a reverse-bias voltage may be applied to the light emitting element of each of the second pixels.

When the display device displays an image which is not the black image, a forward-bias voltage may be applied the light emitting element of each of the second pixels, or there may be no voltage difference between the anode and the cathode of the light emitting element of each of the second pixels.

A width/length of a channel of driving transistors included in the second pixels may be greater than a width/length of a channel of driving transistors included in the first pixels.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
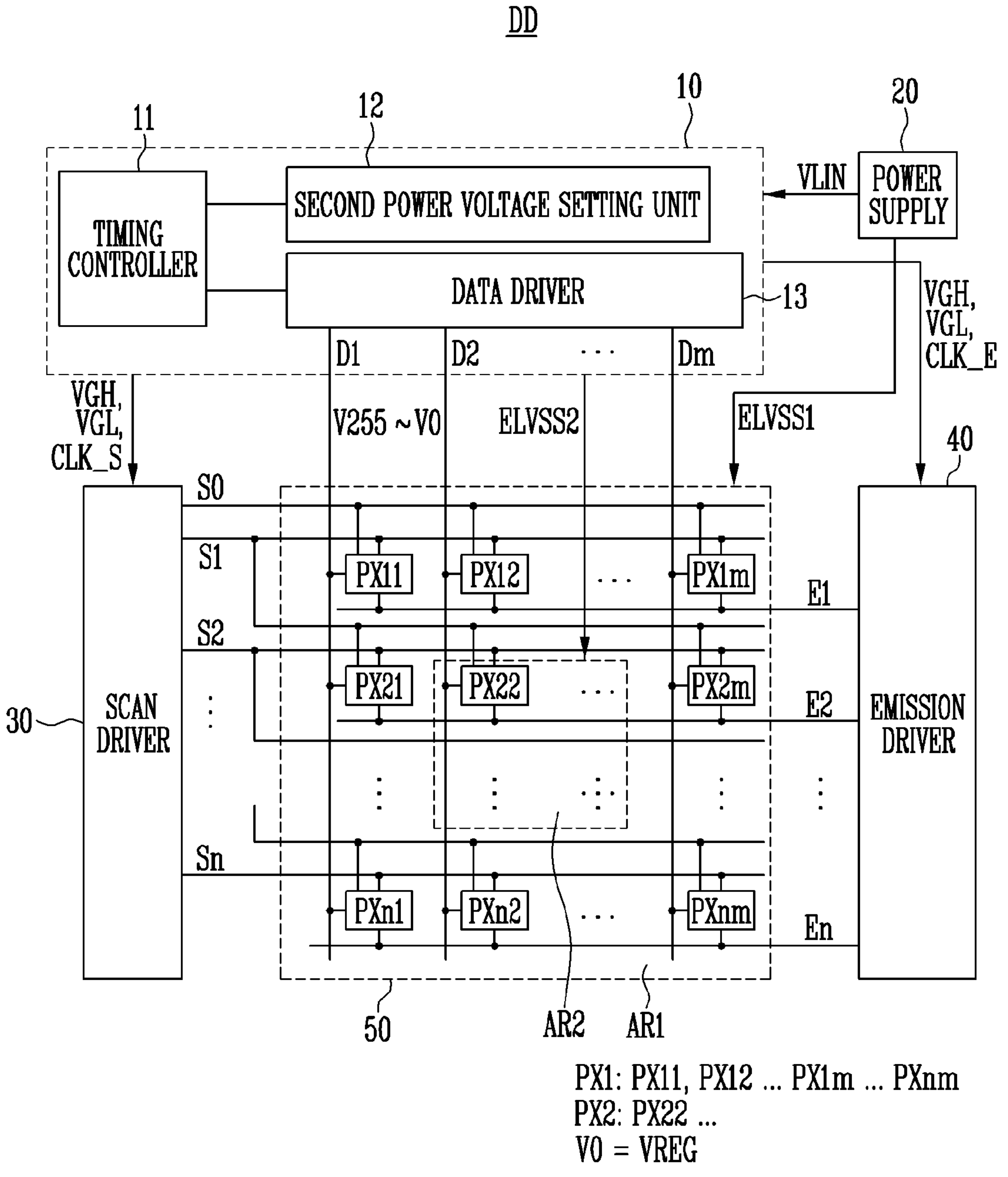
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. As used herein, the term "A/B" includes cases of "A", "B" and "A and B".

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

In description, the expression "equal" may mean "substantially equal." That is, this may mean equality to a degree to which those skilled in the art can understand the equality. Other expressions may be expressions in which "substantially" is omitted.

FIG. 1 is a diagram illustrating a display device in accordance with an embodiment of the present disclosure.

Referring to FIG. 1, the display device DD in accordance with the embodiment of the present disclosure may include a driver integrated circuit (IC) 10, a power supply 20, a scan driver 30, an emission driver 40, and a pixel unit 50.

The pixel unit 50 may include pixels PX11 to PXnm. Each pixel may be connected to a corresponding data line, a corresponding scan line, and a corresponding emission line. It may be expressed that pixels connected to the same scan line and the same emission line belongs to one pixel row.

The pixel unit 50 may include a first area AR1 including first pixels PX1 (e.g., PX11, PX12 . . . PXnm) disposed with a first density and a second area AR2 including second pixels PX2 (e.g., PX22, . . . ) disposed with a second density smaller than the first density. A density may mean a number of light emitting elements of pixels disposed in a unit area. That is, the density may become larger as the number of light emitting elements disposed in the unit area becomes larger. Meanwhile, the density may mean a ratio of a total area which light emitting elements occupy in the unit area to a total area of the unit area. That is, the density may become larger as the total area which the light emitting elements occupy in the unit area becomes larger. Even though in FIG. 1, the first pixels PX1 are illustrated to include PX11, PX12 . . . PX1*m* . . . and PXnm, and the second pixels PX2 are illustrated to include PX22 . . . , this is an example and the grouping of the pixels is not limited thereto.

For example, an optical sensor such as a camera may be located under the second area AR2. the second area AR2 may include a portion in which second light emitting elements of the second pixels PX2 are not located such that the optical sensor can receive light through the portion of the second area AR2. Therefore, a pixel density of the second area AR2 may be set smaller than a pixel density of the first area AR1.

The driver-IC 10 may include a timing controller 11 and a data driver 13. According to products, when a plurality of data drivers are required, each of a plurality of driver-ICs may include a data driver, and the timing controller may separately exist to control the plurality of driver-Ics. Hereinafter, a case where the timing controller 11 and the data driver 13 exist in one driver-IC 10 is assumed and described.

Also, the driver-IC 10 may include a second power voltage setting unit 12. The second power voltage setting unit 12 may set a magnitude of a second power voltage ELVSS2 commonly supplied to cathodes of second light emitting elements of the second pixels PX2 of the second area AR2.

The driver-IC 10 may generate a black data voltage VREG and a transistor-off voltage VGH. The black data voltage VREG may be a data voltage V0 corresponding to a black grayscale among data voltages V0 to V255 output to data lines D1 to Dm of the display device DD from the driver-IC 10. The other data voltages V1 to V255 may be voltages generated by dividing the black data voltage VREG. The number of the data voltages V0 to V255 may vary according to products.

Magnitudes of the data voltages V0 to V255 may vary according to maximum luminance information of the display device DD. A maximum luminance indicated by the maximum luminance information may be luminance information of light emitted from pixels set to a maximum grayscale of the display device DD. For example, the maximum luminance may be a luminance of white light generated as all the pixels of the pixel unit 50 emit light to correspond to a white grayscale. The unit of a luminance may be nits. The maximum luminance may also be referred to as a display brightness value. The maximum luminance may be manually set by manipulation of a user with respect to the display device DD, or be automatically set by an algorithm associated with an illuminance sensor or the like. For example, a maximum value of the maximum luminance may be 3000 nits, and a minimum value of the maximum luminance may be 4 nits. The maximum value and the minimum value of the maximum luminance may be variously set according to products. A data voltage varies according to the maximum luminance even with respect to the same grayscale, and therefore, the light emitting luminance of a pixel may also vary.

The transistor-off voltage VGH may be output from the driver-IC 10 to the scan driver 30 or the emission driver 40. The transistor-off voltage VGH may be applied to scan lines S0 to Sn or emission lines E1 to En during a certain period under the control of the scan driver 30 or the emission driver 40. An application timing of the transistor-off voltage VGH will be described later with reference to FIG. 3.

The power supply 20 may supply a first power voltage ELVSS1 commonly supplied to cathodes of first light emitting elements of the first pixels PX1. Although not shown in the drawing, the power supply 20 may supply a third power voltage ELVDD commonly supplied to the first pixels PX1 and the second pixels PX2 (See FIG. 2). The first power voltage ELVSS1 and the third power voltage ELVDD may be supplied to the pixel unit 50 to be used in generating of a driving current flowing through a light emitting element. Also, the power supply 20 may generate an IC base voltage VLIN and provide the generated IC base voltage VLIN to the driver-IC 10. The IC base voltage VLIN may be a high voltage used in generating of the black data voltage VREG, the transistor-off voltage VGH, and a transistor-on voltage VGL in the driver-IC 10. For example, the power supply 20 may be a power management integrated circuit ("PMIC"). For example, the power supply 20 may be configured with a plurality of DC-DC converters.

The timing controller 11 may convert a control signal and an image signal, which are supplied from a processor (e.g., an application processor ("AP"), a central processing unit ("CPU"), a graphics processing unit ("GPU"), or the like), to be suitable for specifications of the display device DD, and supply a control signal and an image signal to the data driver 13, the scan driver 30, and the emission driver 40.

The data driver 13 may receive the control signal and the image signal from the timing controller 11 and generate data voltages V0 to V255 to be supplied to the data lines D1 to Dm. For example, the data driver 13 may generate data voltages in units of pixel rows, and simultaneously apply the generated data voltages to the data lines D1 to Dm.

The scan driver 30 may receive a control signal CLK_S, the transistor-off voltage VGH, and the transistor-on voltage VGL from the driver-IC 10, and generate scan signals to be supplied to the scan lines S0 to Sn. The control signal CLK_S may be at least one clock signal. The scan driver 30 may have scan stage circuits corresponding to the scan lines S0 to Sn. The scan stage circuits may be connected in the form of shift registers, so that an output of a next scan stage circuit is generated based on an output of a previous scan stage circuit. Each of the scan stage circuits may output a scan signal in which the control signal CLK_S and the transistor-off voltage VGH are combined. In another embodiment, the scan stage circuits may output a scan signal in which the transistor-on voltage VGL and the transistor-off voltage VGH are combined.

The emission driver 40 may receive a control signal CLK_E, the transistor-off voltage VGH, and the transistor-on voltage VGL from the driver-IC 10, and generate emission signals to be supplied to the emission line E1 to En. The control signal CLK_E may be at least one clock signal. The emission driver 40 may have emission stage circuits corresponding to the emission lines E1 to En. The emission stage circuits may be connected in the form of shift registers, so that an output of a next emission stage circuit is generated based on an output of a previous emission stage circuit. Each of the emission stage circuits may output an emission signal in which the transistor-on voltage VGL and the transistor-off voltage VGH are combined.

In FIG. 1, it is illustrated that the second power voltage ELVSS2 for the second area AR2 is supplied from the driver-IC 10. Since the second area AR2 is an area relatively narrower than the first area AR1, a relatively small current is required, and therefore, the second power voltage ELVSS2 may be generated/supplied in the driver-IC 10 instead of the power supply 20. Similarly, a third power voltage ELVDD for the second area AR2 may also be generated/supplied in the driver-IC 10 (see FIG. 2). It will be apparent that the second power voltage ELVSS2 and the third power voltage ELVDD for the second area AR2 may be generated in the power supply 20.

Figure 2:
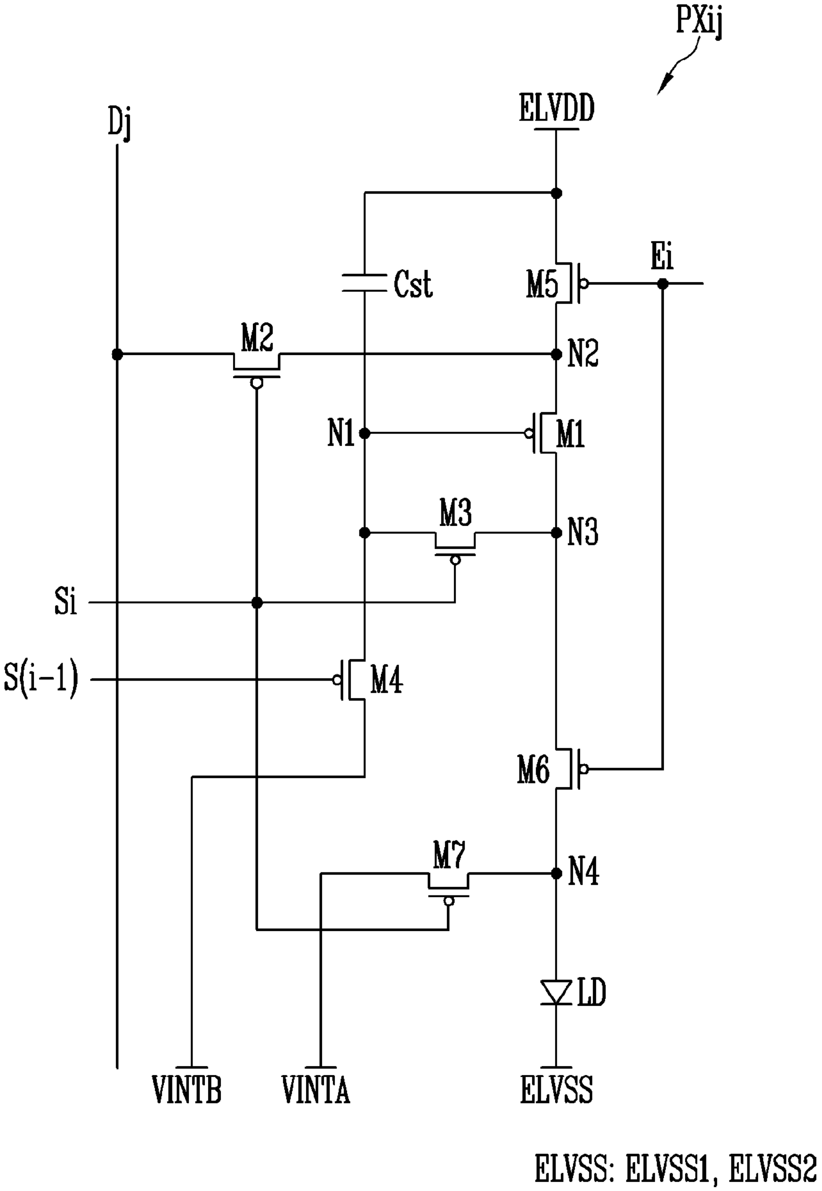
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXij may include transistors M1, M2, M3, M4, M5, M6, and M7, a storage capacitor Cst, and a light emitting element LD. The structure of the pixel PXij shown in FIG. 2 may be commonly applied to the first pixels PX1 and the second pixels PX2.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor ("TFT"), a Field Effect Transistor ("FET"), a Bipolar Junction Transistor ("BJT"), and the like.

A first transistor M1 may include a gate electrode connected to a first node N1, a first electrode connected to a second node N2, and a second electrode connected to a third node N3. The first transistor M1 may be referred to as a driving transistor.

A second transistor M2 may include a gate electrode connected to a scan line Si, a first electrode connected to a data line Dj, and a second electrode connected to the second node N2. The gate electrode of the second transistor M2 may receive the transistor-off voltage VGH.

A third transistor M3 may include a gate electrode connected to the scan line Si, a first electrode connected to the first node N1, and a second electrode connected to the third node N3. The gate electrode of the third transistor M3 may receive the transistor-off voltage VGH.

A fourth transistor M4 may include a gate electrode connected to a scan line S(i−1), a first electrode connected to the first node N1, and a second electrode for receiving an on-bias voltage VINTB. The gate electrode of the fourth transistor M4 may receive the transistor-off voltage VGH.

A fifth transistor M5 may include a gate electrode connected to an emission line Ei, a first electrode for receiving the third power voltage ELVDD, and a second electrode connected to the second node N2.

A sixth transistor M6 may include a gate electrode connected to the emission line Ei, a first electrode connected to the third node N3, and a second electrode connected to a fourth node N4.

A seventh transistor M7 may include a gate electrode connected to the scan line Si, a first electrode for receiving an initialization voltage VINTA, and a second electrode connected to the fourth node N4. The gate electrode of the seventh transistor M7 may receive the transistor-off voltage VGH.

The storage capacitor Cst may include a first electrode for receiving the third power voltage ELVDD and a second electrode connected to the first node N1.

The light emitting element LD may include an anode connected to the fourth node N4 and a cathode for receiving a power voltage ELVSS. The power voltage ELVSS may correspond to the first power voltage ELVSS1 or the second power voltage ELVSS2. For example, in the first pixel PX1, the power voltage ELVSS may correspond to the first power voltage ELVSS1, and in the second pixel PX2, the power voltage ELVSS may correspond to the second power voltage ELVSS2. The light emitting element LD may be a light emitting diode. The light emitting element LD may be configured as an organic light emitting diode, an inorganic light emitting diode, a quantum dot/well light emitting diode, or the like. The light emitting element LD may emits line of any one color among a first color, a second color, and a third color. In addition, in this embodiment, only one light emitting element LD is provided in each pixel. However, in another embodiment, a plurality of light emitting elements may be provided in each pixel. The plurality of light emitting elements may be connected in series, parallel, series/parallel, or the like.

Figure 3:
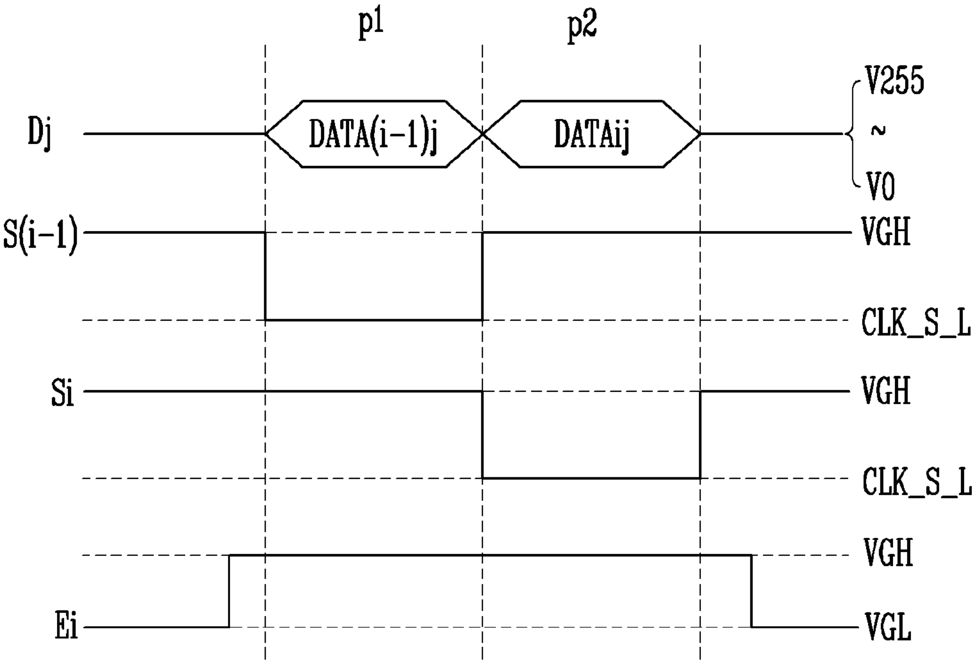
FIG. 3 is a diagram illustrating an exemplarily driving method of the pixel shown in FIG. 2.

FIG. 3 is a diagram illustrating an exemplarily driving method of the pixel shown in FIG. 2.

In a period p1, a data voltage DATA(i−1)j for a previous pixel row is applied to a data line Dj, and a scan signal having a turn-on level (e.g., low level) is applied to a previous scan line S(i−1). The scan signal having the turn-on level may be a voltage CLK_S_L corresponding to a low level of the above-described control signal CLK_S.

Since a scan signal having a turn-off level (e.g., high level) is applied to a current scan line Si, the second transistor M2 is in a turn-off state, and the data voltage DATA(i−1)j for the previous pixel row is prevented from being input to the pixel PXij. The scan signal having the turn-off level may be the transistor-off voltage VGH.

Since the fourth transistor M4 is in a turn-on state, the on-bias voltage VINTB may be applied to the gate electrode of the first transistor M1. The on-bias voltage VINTB may have a magnitude smaller than magnitudes of the data voltages V0 to V255. Since an emission signal having a turn-off level is applied to the emission line Ei, the fifth and sixth transistors M5 and M6 are in the turn-off state, and unnecessary light emission of the light emitting element LD is prevented. The emission signal having the turn-off level may be the transistor-off voltage VGH.

In a period p2, a data voltage DATAij for a current pixel row is applied to the data line Dj, and the scan signal having the turn-on level is applied to the current scan line Si. Accordingly, the second transistor M2 and the third transistor M3 are in the turn-on state. Meanwhile, since the first transistor M1 in a state in which the on-bias voltage VINTB is applied to the gate electrode of the first transistor M1 is also in the turn-on state, the data line Dj and the gate electrode of the first transistor M1 are electrically connected to each other. Therefore, a compensation voltage obtained by subtracting a threshold voltage of the first transistor T1 from the data voltage DATAij is applied to the second electrode of the storage capacitor Cst (i.e., the first node N1), and the storage capacitor Cst maintains a voltage corresponding to a difference between the third power voltage ELVDD and the compensation voltage. Such a period may be referred to as a threshold voltage compensation period or a data writing period.

Since the seventh transistor M7 is in the turn-on state, the initialization voltage VINTA may be applied to the anode of the light emitting element LD. The light emitting element LD may be forward-biased or reverse-biased according to a difference between the initialization voltage VINTA and the power voltage ELVSS. Meanwhile, the initialization voltage VINTA and the power voltage ELVSS may have the same magnitude.

As an emission signal having a turn-on level is applied after the period p2, the fifth and sixth transistors M5 and M6 are electrically connected to each other, and an amount of driving current passing through the first transistor M1 is adjusted according to a quantity of charges accumulated in the storage capacitor Cst, so that the driving current flows through the light emitting element LD. The light emitting element LD emits light until before the emission signal having the turn-off level is applied. The emission signal having the turn-on level may be the transistor-on voltage VGL.

Figure 4:
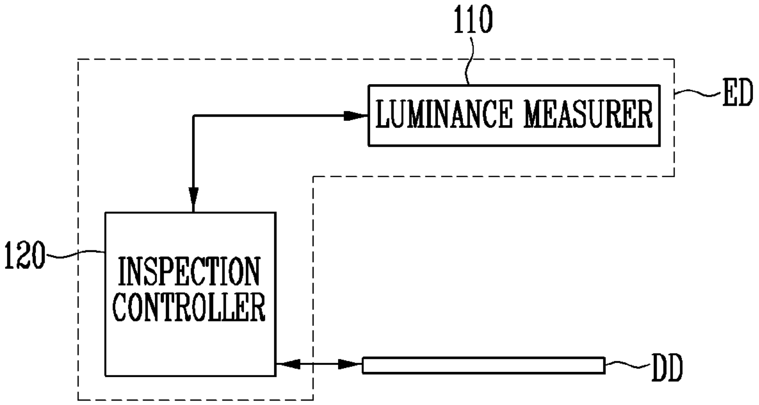
FIG. 4 is a diagram illustrating a voltage setting device in accordance with an embodiment of the present disclosure.
Figure 5:
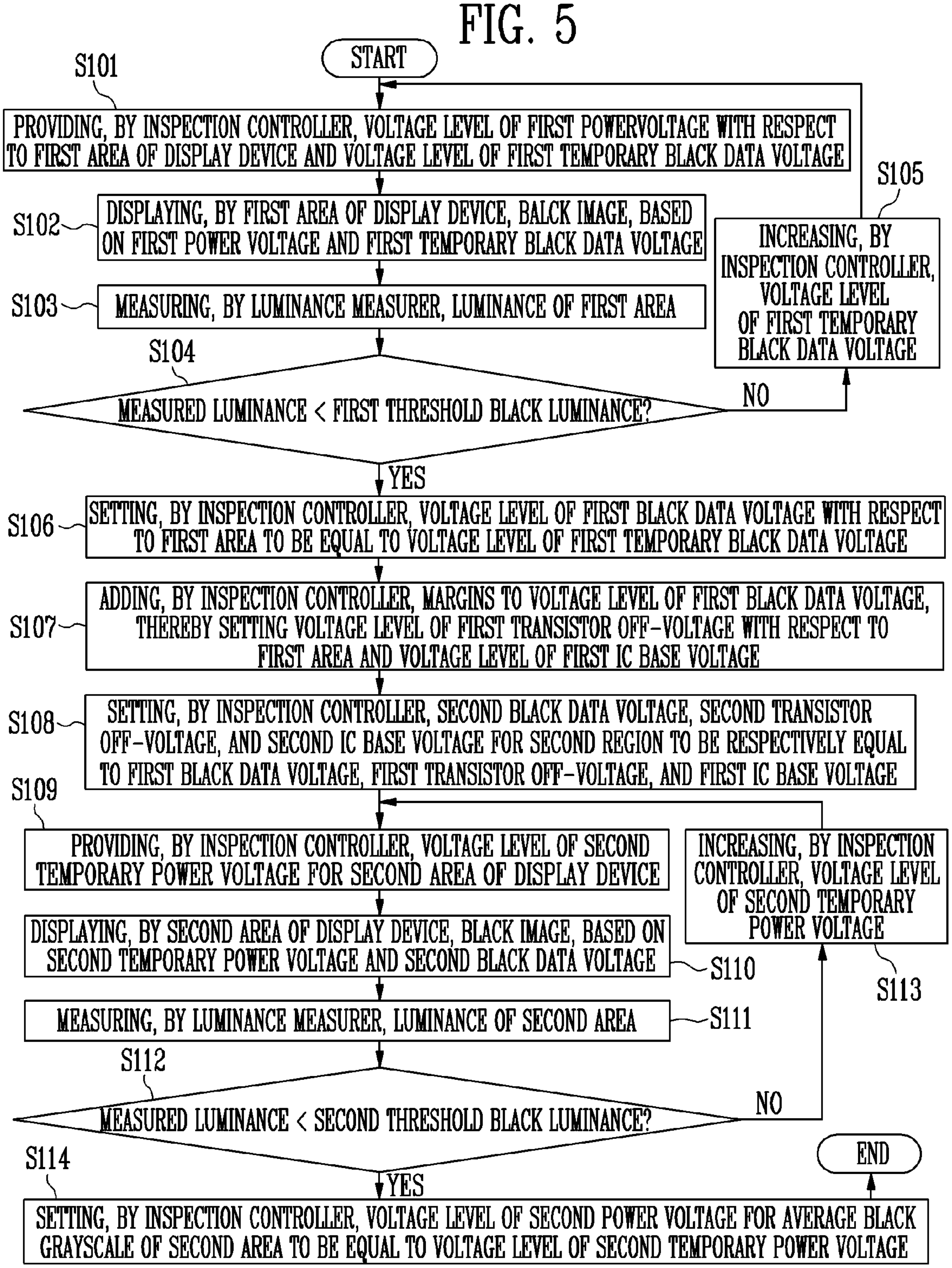
FIG. 5 is a flowchart illustrating a voltage setting method of the display device in accordance with an embodiment of the present disclosure.

FIG. 4 is a diagram illustrating a voltage setting device in accordance with an embodiment of the present disclosure. FIG. 5 is a flowchart illustrating a voltage setting method of the display device in accordance with an embodiment of the present disclosure.

Referring to FIG. 4, the voltage setting device ED in accordance with the embodiment of the present disclosure may include a luminance measurer 110 and an inspection controller 120. The inspection controller 120 may be configured as a general-purpose or dedicated computing device. The computing device may include a recording medium and a processor. The recording medium and the processor may be included in the physically same device. However, the recording medium and the processor may be included in physically different devices by using a cloud technique or the like. The luminance measurer 110 may be configured as a camera or a luminance meter.

The recording medium includes all kinds of recording devices in which data or programs, which can be read by the processor, can be stored. Examples of the recording medium which the processor can read may be ROMs, RAMs, CD-ROMs, magnetic tapes, floppy discs, optical data storage devices, hard discs, external hard disks, SSDs, USB storage devices, DVDs, blue-ray discs, and the like. Also, the recording medium which the processor can read may be a combination of a plurality of devices, and be distributed in a computer system connected through a network. The recording medium may be a non-transitory computer readable medium. The non-transitory computer readable medium is not a medium which stores data or programs for a short moment, such as a register, a cache, or a memory, but means a medium which semi-permanently stores data or programs and can be read by the processor.

First, the inspection controller 120 may provide a magnitude of a first power voltage ELVSS1 with respect to the first area AR1 of the display device DD and a magnitude of a first temporary black data voltage (S101).

The first area AR1 of the display device DD may display a black image, based on the first power voltage ELVSS1 and the first temporary black data voltage (S102). As described with reference to FIGS. 2 and 3, the first power voltage ELVSS1 may be applied to the cathode of the light emitting element LD of the first pixel, and the first temporary black data voltage may be supplied to the data line Dj, so that the first area AR1 displays the black image.

Next, the luminance measurer 110 may measure a luminance of the first area AR1 (S103). The inspection controller 120 may compare the measured luminance with a first threshold black luminance (S104). When the measured luminance is greater than the first threshold black luminance, the inspection controller 120 may increase the magnitude of the first temporary black data voltage (S105).

The inspection controller 120 may increase the magnitude of the first temporary black data voltage until the luminance of the first area AR1 becomes smaller than the first threshold black luminance. When the measured luminance of the first area AR1 is smaller than the first threshold black luminance, the inspection controller 120 may set a final magnitude of the first temporary black data voltage to a magnitude of a first black data voltage VREG with respect to the first area AR1 (S106). The inspection controller 120 may add margins to the magnitude of the first black data voltage VREG, thereby setting a magnitude of a first transistor-off voltage VGH with respect to the first area AR1 and a magnitude of a first IC base voltage VLIN (S107). That is, as the first black data voltage VREG becomes higher, the first transistor-off voltage VGH and the first IC base voltage VLIN may be set to become higher. Accordingly, the first IC base voltage VLIN is not set to unconditionally become high, but set using a minimum voltage at which the black image can be displayed with respect to the first area AR1. Thus, power consumption can be effectively reduced.

The inspection controller 120 may set a second black data voltage VREG for the second area AR2 to be equal to the first black data voltage VREG, set a second transistor-off voltage VGH for the second area AR2 to be equal to the first transistor-off voltage VGH, and set a second IC base voltage VLIN for the second area AR2 to be equal to the first IC base voltage VLIN (S108). The inspection controller 120 may set a second initialization voltage VINTA for the second area AR2 to be equal to the first initialization voltage VINTA for the first area AR1.

However, in order for the second area AR2 to use a data voltage similar to a data voltage of the first area AR1, a width/length of a channel of driving transistors M1 included in the second pixels PX2 of the second area AR2 may be set greater than a width/length of a channel of driving transistors M1 included in the first pixels PX1 of the first area AR1. Due to an increased threshold voltage, the second black data voltage VREG higher than the first black data voltage VREG is required to allow the driving current not to flow by turning off the driving transistor M1 of the second pixel PX2.

However, as described above, in this embodiment, the second black data voltage VREG is set to be equal to the first black data voltage VREG, and a reverse-bias voltage is applied to a second light emitting element LD of the second pixel, thereby implementing the black image. Referring back to FIG. 2, the second initialization voltage VINTA is applied to the anode of the light emitting element LD while the seventh transistor M7 is turned on in the period P2. When a second power voltage ELVSS2 is set to become higher than the second initialization voltage VINTA, the reverse-bias voltage may be applied to the second light emitting element LD. Accordingly, although the second black data voltage VREG is set to be equal to the first black data voltage VREG, the black image can be implemented. Consequently, the second IC base voltage VLIN is decreased, so that power consumption can be effectively reduced. In addition, a voltage can be supplied by using the same line, and thus any additional line for the second area AR2 is unnecessary.

Hereinafter, a process of searching for the second power to voltage ELVSS2 for black image implementation in the second area AR2.

The inspection controller 120 may provide a magnitude of a second temporary power voltage for the second area AR2 of the display device DD (S109). The second area AR2 of the display device DD may display a black image, based on the second temporary power voltage and the second black data voltage VREG (S110). As described with reference to FIGS. 2 and 3, the second temporary power voltage is applied to the cathode of the light emitting element LD of the second pixel, and the second black data voltage VREG is supplied to the data line Dj, so that the second area AR2 can display the black image.

Next, the luminance measurer 110 may measure a luminance of the second area AR2 (S111). The inspection controller 120 may compare the measured luminance with a second threshold black luminance (S112). When the measured luminance is greater than the second threshold black luminance, the inspection controller 120 may increase a magnitude of the second temporary power voltage (S113).

The inspection controller 120 may repeatedly increase the magnitude of the second temporary power voltage until the luminance of the second area AR2 becomes smaller than the second threshold black luminance. When the measured luminance of the second area AR2 is smaller than the second threshold black luminance, the inspection controller 120 may set a magnitude of the second power voltage ELVSS2 for an average black grayscale of the second area AR2 to be equal to a final magnitude of the second temporary power voltage (S114).

Figure 6:
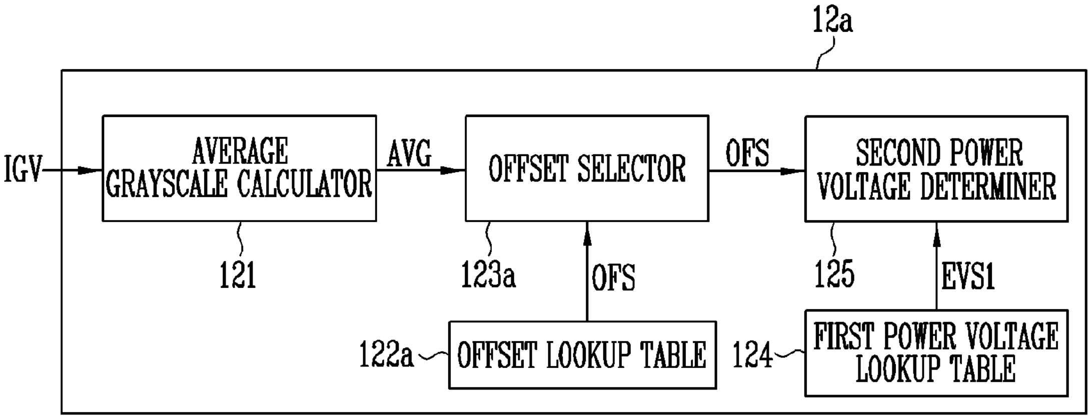
FIG. 6 is a diagram illustrating a second power voltage setting unit in accordance with an embodiment of the present disclosure.

FIG. 6 is a diagram illustrating a second power voltage setting unit in accordance with an embodiment of the present disclosure.

Referring to FIG. 6, the second power voltage setting unit 12*a* in accordance with the embodiment of the present disclosure may include an average grayscale calculator 121, an offset lookup table 122*a*, an offset selector 123*a*, a first power voltage lookup table 124, and a second power voltage determiner 125.

The average grayscale calculator 121 may calculate an average grayscale AVG of a plurality of image frames for the second area AR2. When an average grayscale AVG of one image frame is calculated, the average grayscale AVG may be too rapidly changed. Therefore, it may be preferable to calculate an average grayscale AVG of about 32 previous image frames including a current image frame. The average grayscale calculator 121 may obtain an average of input grayscales IGV of each image frame, thereby calculating the average grayscale AVG.

The offset lookup table 122*a* may pre-store offsets OFS corresponding to various average grayscales AVG. The offset selector 123*a* may select one of the offsets OFS, based on the current average grayscale AVG. To distinguish this average grayscale AVG used to select one of the offsets OFS over the various average grayscales AVG corresponding to the pre-stored offsets OFS, this average grayscale AVG may be referred as the "current" average grayscale AVG.

For example, the offset selector 123*a* may select an offset greater than 0 when the average grayscale AVG corresponds to a black (grayscale 0). For example, the offset selector 123*a* may provide an offset OFS of 0.5 volts (V) to 1.0V when the average grayscale AVG corresponds to the black.

For example, the offset selector 123*a* may select an offset OFS of 0 when the average grayscale AVG corresponds to a low grayscale range (e.g., a range including grayscale 23). For example, the offset selector 123*a* may provide an offset OFS of 0.0V when the average grayscale AVG correspond to the low grayscale range.

In another example, the offset selector 123*a* may select an offset OFS smaller than 0 when the average grayscale AVG corresponds to a low grayscale range (e.g., the grayscale 23). For example, the offset selector 123*a* may provide an offset OFS of −0.5V to 0.0V when the average grayscale AVG corresponds to the low grayscale range.

For example, the offset selector 123*a* may select the offset OFS of 0 when the average grayscale AVG corresponds to a middle grayscale range (e.g., a range including grayscale 127). For example, the offset selector 123*a* may provide the offset OFS of 0.0V when the average grayscale AVG corresponds to the middle grayscale range.

For example, the offset selector 123*a* may select an offset OFS smaller than 0 when the average grayscale AVG corresponds to a high grayscale range (e.g., a range including grayscale 255 (white grayscale)). For example, the offset selector 123*a* may provide an offset OFS of −0.7V to −1.0V when the average grayscale AVG corresponds to the high grayscale range.

The first power voltage lookup table 124 may pre-store magnitudes of a first power voltage ELVSS1. The second power voltage determiner 125 may receive, from the first power voltage lookup table 124, a magnitude EVS1 of a first power voltage ELVSS1 corresponding to the first power voltage ELVSS1 supplied from the power supply 20. The second power voltage determiner 125 may add the selected offset OFS to one EVS1 of the magnitudes of the first power voltage ELVSS1, thereby determining a magnitude of a second power voltage ELVSS2.

Hereinafter, it is assumed that a first initialization voltage VINTA for the first area AR1 is set to be equal to the first power voltage ELVSS1.

For example, when the average grayscale AVG corresponds to the black (the grayscale 0), the first power voltage ELVSS1 provided to the first area AR1 may be −4.3V, and the first initialization voltage VINTA may be −4.3V. In accordance with this embodiment, when the average grayscale AVG corresponds to the black (the grayscale 0), the second power voltage ELVSS2 provided to the second area AR2 may become −3.8V to −3.3V. In addition, a second initialization voltage VINTA may be −4.3V equal to the first initialization voltage VINTA. Thus, a reverse-bias voltage is applied to a second light emitting element, and the second light emitting element emits no light. Accordingly, the second area AR2 can display a black image.

For example, when the average grayscale AVG corresponds to the low grayscale range and the middle grayscale range, the offset OFS of 0 may be provided, so that the second power voltage ELVSS2 is set to be equal to the first power voltage ELVSS1. Luminances in the low grayscale range and the middle grayscale range may be within a luminance range in which a driving transistor of a second pixel can be driven in a saturation area, even when the second power voltage ELVSS2 is set to the same magnitude of the first power voltage ELVSS1. Thus, no problem occurs in image display of the second area AR2. There may be no voltage difference between an anode and a cathode of a second light emitting element. Thus, the reverse-bias voltage is not applied to the second light emitting element, and accordingly, a light emission delay as a capacitance of the second light emitting element is not charged can be prevented.

In another example, when the average grayscale AVG corresponds to the low grayscale range, an offset OFS smaller than 0 may be provided, so that the second power voltage ELVSS2 is set to be smaller than the first power voltage ELVSS1. When the average grayscale AVG corresponds to the low grayscale range, a small driving current is provided, and therefore, charging of the capacitance of the second light emitting element may become slow. In this embodiment, when the average grayscale AVG corresponds to the low grayscale range, a forward-bias is applied to the second light emitting element, so that the capacitance of the second light emitting element is rapidly charged, thereby preventing the light emission delay.

Meanwhile, when the average grayscale AVG corresponds to the high grayscale range (e.g., the range including the grayscale 255 (white grayscale)), an offset OFS smaller than 0 is provided, and therefore, the second power voltage ELVSS2 may be set lower than the first power voltage ELVSS1.

Since a pixel density of the second area AR2 is smaller than a pixel density of the first area AR1, it is desirable for second light emitting elements of the second area AR2 to emit light with a luminance higher than a luminance of first light emitting elements of the first area AR1.

The first transistor M1 shown in FIG. 3 may be driven in a saturation state. As a voltage applied to the gate electrode of the first transistor M1 becomes lower, the amount of driving current may increase. That is, the first transistor M1 may be operated as a current source.

The condition in which the first transistor M1 is driven in the saturation state is shown in the following Equation 1:

$$Vds < Vgs - Vth. \quad \text{Equation 1}$$

Here, Vds is a drain-source voltage difference of the first transistor M1, Vgs is a gate-source difference of the first transistor M1, and Vth is a threshold voltage of the first transistor M1. Vth is smaller than 0. The light emitting element LD may emit light with a higher luminance as the amount of driving current increases. Therefore, in order to display a high-luminance image, a gate voltage decreased as compared with a case for displaying a low-luminance image is required. In addition, according to Equation 1, a decreased drain voltage corresponding to the decreased gate voltage is required. That is, when a high-luminance image is to be displayed, a small power voltage ELVSS as compared with a case for displaying a low-luminance image is required. That is, when magnitudes of a third power voltage ELVDD supplied to the first area AR1 and the second area AR2 are the same, it is desirable that the magnitude of the second power voltage ELVSS2 supplied to the second area AR2 is smaller than the magnitude of the first power voltage ELVSS1 supplied to the first area AR1.

Figure 7:
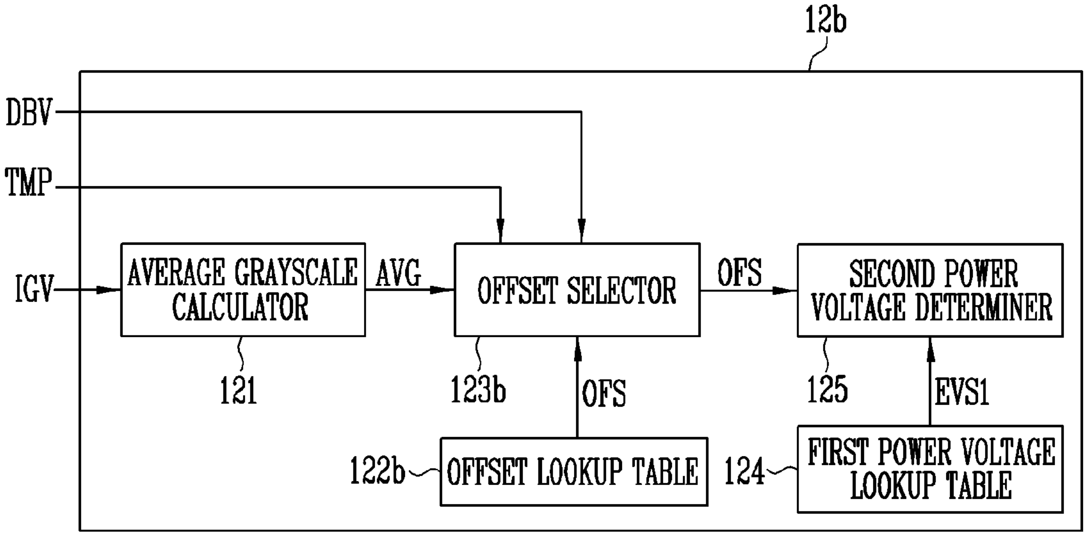
FIG. 7 is a diagram illustrating a second power voltage setting unit in accordance with another embodiment of the present disclosure.

FIG. 7 is a diagram illustrating a second power voltage setting unit in accordance with another embodiment of the present disclosure.

In the second power voltage setting unit 12*b* shown in FIG. 7, an offset lookup table 122*b* and an offset selector 123*b* may be configured differently from the offset lookup table 122*a* and the offset selector 123*a* of the second power voltage setting unit 12*a* shown in FIG. 6. The other components of the second power voltage setting unit 12*b* are identical to the other components of the second power voltage setting unit 12*a* shown in FIG. 6, and therefore, overlapping descriptions will be omitted.

The offset lookup table 122*b* may pre-store offsets OFS corresponding to various temperature information TMP, various maximum luminance information DBV, and various average grayscales AVG. The offset selector 123*b* may select one of the offsets OFS, based on current temperature information TMP, current maximum luminance information DBV, and a current average grayscale AVG. The wording "current" may be used for the same rationale related to the offset selector 123*a* mentioned above.

For example, with respect to the same average grayscale AVG, the offset selector 123*b* may select a smaller offset OFS as the temperature of the display device DD, which the temperature information TMP indicates, becomes lower. Also, with respect to the same average grayscale AVG, the offset selector 123*b* may select a smaller offset OFS as the maximum luminance of the display device DD, which the maximum luminance information DBV indicates, becomes larger. That is, as the maximum luminance of the display device DD becomes larger, the second power voltage setting unit 12 may allow a difference between the third power voltage ELVDD and the second power voltage ELVSS2 to become larger, thereby expressing a larger maximum luminance.

In the display device and the driving method thereof in accordance with the present disclosure, a desired black grayscale and a desired white grayscale can be expressed by using a minimum number of lines with respect to a plurality of areas having different pixel densities, and a display delay in an intermediate grayscale can be minimized.

As used in connection with various embodiments of the disclosure, each of the luminance measurer 110, the inspection controller 120, the average grayscale calculator 121, the offset selector 123*a* and 123*b*, and the second power voltage determiner 125 may be implemented in hardware, software, or firmware, for example, implemented in a form of an application-specific integrated circuit (ASIC).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a pixel unit including a first area including first pixels disposed with a first density and a second area including second pixels disposed with a second density smaller than the first density;

a power supply configured to supply a first power voltage commonly supplied to cathodes of first light emitting elements of the first pixels;

a second-power voltage setting unit configured to set a magnitude of a second power voltage commonly supplied to cathodes of second light emitting elements of the second pixels, wherein, when the pixel unit displays a black image, the second-power voltage setting unit sets the second power voltage to be higher than the first power voltage, wherein the second-power voltage setting unit includes an average grayscale calculator configured to calculate a current average grayscale of a plurality of image frames having a same single value for the plurality of image frames for the second area, wherein the second-power voltage setting unit further includes an offset selector configured to select one of a plurality of offsets based on current temperature information, current maximum luminance information, and the current average grayscale, and wherein each of the first pixels includes:

a first transistor including a gate electrode connected to a first node, a first electrode connected to a second node, and a second electrode connected to a third node;

a second transistor including a gate electrode for receiving a first transistor-off voltage, a first electrode connected to a data line, and a second electrode connected to the second node;

a third transistor including a gate electrode for receiving the first transistor-off voltage, a first electrode connected to the first node, and the second electrode connected to the third node;

a fourth transistor including a gate electrode for receiving the first transistor-off voltage, a first electrode connected to the first node, and a second electrode for receiving an on-bias voltage;

a fifth transistor including a gate electrode connected to an emission line, a first electrode for receiving a third power voltage, and a second electrode connected to the second node;

a sixth transistor including a gate electrode connected to the emission line, a first electrode connected to the third node, and a second electrode connected to a fourth node;

a seventh transistor including a gate electrode for receiving the first transistor-off voltage, a first electrode for receiving a first initialization voltage, and a second electrode connected to the fourth node;

a storage capacitor including a first electrode for receiving the third power voltage and a second electrode connected to the first node; and a light emitting element including an anode connected to the fourth node and a cathode for receiving the first power voltage.

2. The display device of claim 1, wherein, when the pixel unit displays the black image, a magnitude of a first data voltage supplied to the first pixels is equal to a magnitude of a second data voltage supplied to the second pixels.

3. The display device of claim 2, wherein, when the pixel unit displays the black image, a magnitude of the first transistor-off voltage supplied to the first pixels is equal to a magnitude of a second transistor-off voltage supplied to the second pixels.

4. The display device of claim 3, wherein, when the pixel unit displays the black image, a magnitude of the first initialization voltage supplied to the first pixels is equal to a magnitude of a second initialization voltage supplied to the second pixels.

5. The display device of claim 4, wherein each of the second pixels includes:

a first transistor including a gate electrode connected to a first node, a first electrode connected to a second node, and a second electrode connected to a third node;

a second transistor including a gate electrode for receiving the second transistor-off voltage, a first electrode connected to the data line, and a second electrode connected to the second node;

a third transistor including a gate electrode for receiving the second transistor-off voltage, a first electrode connected to the first node, and a second electrode connected to the third node;

a fourth transistor including a gate electrode for receiving the second transistor-off voltage, a first electrode connected to the first node, and a second electrode for receiving the on-bias voltage;

a fifth transistor including a gate electrode connected to the emission line, a first electrode for receiving the third power voltage, and a second electrode connected to the second node;

a sixth transistor including a gate electrode connected to the emission line, a first electrode connected to the third node, and a second electrode connected to a fourth node;

a seventh transistor including a gate electrode for receiving the second transistor-off voltage, a first electrode for receiving the second initialization voltage, and a second electrode connected to the fourth node;

a storage capacitor including a first electrode for receiving the third power voltage and a second electrode connected to the first node; and a light emitting element including an anode connected to the fourth node and a cathode for receiving the second power voltage.

6. The display device of claim 1, wherein the second-power voltage setting unit further includes:

an offset lookup table configured to store the plurality of offsets corresponding to various temperature information including the current temperature information, various maximum luminance information including the current maximum luminance information, and various average grayscales including the current average grayscale.

7. A display device comprising:

a pixel unit including a first area including first pixels disposed with a first density and a second area including second pixels disposed with a second density smaller than the first density;

a power supply configured to supply a first power voltage commonly supplied to cathodes of first light emitting elements of the first pixels; and a second-power voltage setting unit configured to set a magnitude of a second power voltage commonly supplied to cathodes of second light emitting elements of the second pixels, wherein, when the pixel unit displays a black image, the second-power voltage setting unit sets the second power voltage to be higher than the first power voltage, and wherein the second-power voltage setting unit includes an average grayscale calculator configured to calculate a current average grayscale of a plurality of image frames having a same single value for the plurality of image frames for the second area, wherein the second-power voltage setting unit further includes:

an offset lookup table configured to store offsets corresponding to various average grayscales;

an offset selector configured to select one of the offsets based on the current average grayscale;

a first-power voltage lookup table configured to store magnitudes of the first power voltage; and a second-power voltage determiner configured to determine the magnitude of the second power voltage by adding the selected offset to one of the magnitudes of the first power voltage.

8. A voltage setting method of a display device including a first area including first pixels disposed with a first density and a second area including second pixels disposed with a second density smaller than the first density, the voltage setting method comprising:

displaying, by the first area, a black image based on a first power voltage and a first temporary black data voltage;

increasing a magnitude of the first temporary black data voltage until a luminance of the first area becomes smaller than a first threshold black luminance, and setting a magnitude of a first black data voltage for the first area to be equal to a final magnitude of the first temporary black data voltage;

setting a magnitude of a second black data voltage for the second area to be equal to the magnitude of the first black data voltage;

displaying, by the second area, a black image based on a second temporary power voltage and the second black data voltage; and increasing a magnitude of the second temporary power voltage until a luminance of the second area becomes smaller than a second threshold black luminance, and setting a magnitude of a second power voltage for the second area to be equal to a final magnitude of the second temporary power voltage.

9. The voltage setting method of claim 8, wherein the first power voltage is a voltage commonly supplied to cathodes of first light emitting elements of the first pixels, and the second power voltage is a voltage commonly supplied to cathodes of second light emitting elements of the second pixels.

10. The voltage setting method of claim 9, wherein, when the display device displays the black image, the second power voltage is set higher than the first power voltage.

11. The voltage setting method of claim 10, wherein, when the display device displays the black image, a magnitude of a first transistor-off voltage supplied to the first pixels is set equal to a magnitude of a second transistor-off voltage supplied to the second pixels.

12. The voltage setting method of claim 11, wherein, when the display device displays the black image, a magnitude of a first initialization voltage supplied to the first pixels is set equal to a magnitude of a second initialization voltage supplied to the second pixels.

13. The voltage setting method of claim 12, wherein each of the first pixels includes:

a first transistor including a gate electrode connected to a first node, a first electrode connected to a second node, and a second electrode connected to a third node;

a second transistor including a gate electrode receiving the first transistor-off voltage, a first electrode connected to a data line, and a second electrode connected to the second node;

a third transistor including a gate electrode receiving the first transistor-off voltage, a first electrode connected to the first node, and the second electrode connected to the third node;

a fourth transistor including a gate electrode receiving the first transistor-off voltage, a first electrode connected to the first node, and a second electrode receiving an on-bias voltage;

a fifth transistor including a gate electrode connected to an emission line, a first electrode receiving a third power voltage, and a second electrode connected to the second node;

a sixth transistor including a gate electrode connected to the emission line, a first electrode connected to the third node, and a second electrode connected to a fourth node;

a seventh transistor including a gate electrode receiving the first transistor-off voltage, a first electrode receiving the first initialization voltage, and a second electrode connected to the fourth node;

a storage capacitor including a first electrode receiving the third power voltage and a second electrode connected to the first node; and a light emitting element including an anode connected to the fourth node and a cathode receiving the first power voltage.

14. The voltage setting method of claim 12, wherein each of the second pixels includes:

a first transistor including a gate electrode connected to a first node, a first electrode connected to a second node, and a second electrode connected to a third node;

a second transistor including a gate electrode receiving the second transistor-off voltage, a first electrode connected to a data line, and a second electrode connected to the second node;

a third transistor including a gate electrode receiving the second transistor-off voltage, a first electrode connected to the first node, and a second electrode connected to the third node;

a fourth transistor including a gate electrode receiving the second transistor-off voltage, a first electrode connected to the first node, and a second electrode receiving an on-bias voltage;

a fifth transistor including a gate electrode connected to an emission line, a first electrode receiving a third power voltage, and a second electrode connected to the second node;

a sixth transistor including a gate electrode connected to the emission line, a first electrode connected to the third node, and a second electrode connected to a fourth node;

a seventh transistor including a gate electrode receiving the second transistor-off voltage, a first electrode receiving the second initialization voltage, and a second electrode connected to the fourth node;

a storage capacitor including a first electrode receiving the third power voltage and a second electrode connected to the first node; and a light emitting element including an anode connected to the fourth node and a cathode receiving the second power voltage.

15. The voltage setting method of claim 14, wherein, when the display device displays the black image, a reverse-bias voltage is applied to the light emitting element of each of the second pixels.

16. The voltage setting method of claim 15, wherein, when the display device displays an image which is not the black image, a forward-bias voltage is applied the light emitting element of each of the second pixels, or there is no voltage difference between the anode and the cathode of the light emitting element of each of the second pixels.

17. The voltage setting method of claim 8, wherein a width/length of a channel of driving transistors included in the second pixels is greater than a width/length of a channel of driving transistors included in the first pixels.

* * * * *